United States Patent
Takenaka et al.

(10) Patent No.: US 8,446,368 B2
(45) Date of Patent: May 21, 2013

(54) INPUT APPARATUS

(75) Inventors: Tetsuya Takenaka, Yokohama (JP);
Tomotake Aono, Yokohama (JP)

(73) Assignee: Kyocera Corporation, Kyoto (JP)

( * ) Notice: Subject to any disclaimer, the term of this patent is extended or adjusted under 35 U.S.C. 154(b) by 382 days.

(21) Appl. No.: 12/674,649

(22) PCT Filed: Aug. 22, 2008

(86) PCT No.: PCT/JP2008/065035
§ 371 (c)(1),
(2), (4) Date: Jul. 14, 2010

(87) PCT Pub. No.: WO2009/025367
PCT Pub. Date: Feb. 26, 2009

(65) Prior Publication Data
US 2011/0169731 A1     Jul. 14, 2011

(30) Foreign Application Priority Data
Aug. 23, 2007   (JP) .................................. 2007-217556

(51) Int. Cl.
*G06F 3/02* (2006.01)
(52) U.S. Cl.
USPC ............ 345/169; 345/168; 345/157; 715/271
(58) Field of Classification Search
USPC ... 345/156, 157, 168, 169, 173; 715/700–866
See application file for complete search history.

(56) References Cited

U.S. PATENT DOCUMENTS

| 7,912,697 | B2 * | 3/2011 | Tomishige et al. | 704/8 |
|---|---|---|---|---|
| 8,188,976 | B2 * | 5/2012 | Suzuki et al. | 345/169 |
| 2005/0114138 | A1 * | 5/2005 | Tomishige et al. | 704/260 |
| 2005/0183036 | A1 * | 8/2005 | Torii | 715/825 |
| 2007/0013650 | A1 * | 1/2007 | Ladouceur | 345/156 |
| 2008/0227499 | A1 * | 9/2008 | Suzuki et al. | 455/566 |
| 2009/0055732 | A1 * | 2/2009 | Motaparti et al. | 715/261 |
| 2011/0037775 | A1 * | 2/2011 | Park et al. | 345/592 |

FOREIGN PATENT DOCUMENTS

| CN | 1486564 | 3/2004 |
|---|---|---|
| CN | 1619475 | 5/2005 |
| JP | SHO63-080631 | 5/1988 |

(Continued)

OTHER PUBLICATIONS

International Search Report for PCT/JP2008/065035, mailed Oct. 28, 2008, 1 page.

(Continued)

*Primary Examiner* — Dmitriy Bolotin
(74) *Attorney, Agent, or Firm* — Duane Morris LLP

(57) ABSTRACT

An input apparatus 10 includes an input unit 11, a display unit 12, an input mode determination unit 13 for determining whether an input is in a first input mode or a second input mode and an input control unit for controlling, when the input to a key is determined as the first input mode, so that a plurality of characters assigned to the key are changed and displayed in sequence as input character candidates in response to the input, and when the input to the is determined as the second input mode, for searching characters corresponding to the characters assigned to the key among the inputted character strings as correction character candidates and controlling, to the searched correction character candidates, movement of the cursor displayed on the display unit 12 in response to the input.

17 Claims, 16 Drawing Sheets

FOREIGN PATENT DOCUMENTS

| | | |
|---|---|---|
| JP | 01-130260 | 5/1989 |
| JP | 02-056055 | 2/1990 |
| JP | 05-081255 | 4/1993 |
| JP | 2001-177638 | 6/2001 |
| JP | 2005-173966 | 6/2005 |
| JP | 2006-221568 | 8/2006 |
| JP | 2007-206978 | 8/2007 |
| WO | WO03/041371 A1 * | 5/2003 |

OTHER PUBLICATIONS

Office Action for Chinese Patent Application No. 200880103868.7, mailed Mar. 21, 2012, 8 pages. (including English translation).

Office Action from Chinese Patent Application No. 200880103868.7, mailed on Apr. 13, 2011.

Office Action dated Jan. 22, 2013, issued in corresponding Japanese Patent Application No. 2012-130140.

Office Action dated Feb. 26, 2013, issued in corresponding Japanese Patent Application No. 2012-074971.

Office Action dated Feb. 26, 2013, issued in corresponding Chinese Patent Application No. 200880102514.0.

Office Action dated Feb. 26, 2013, issued in corresponding Japanese Patent Application No. 2012-04971.

* cited by examiner

KEUKA (b)

株式会社●●●●●で発売
されて[図]名商品は素晴らし[図]
稀有かが[図]ります。

(c)

株式会社●●●●●で発売
されて[図]名商品は素晴らし[図]
稀有かが[図]ります。

(d)

株式会社●●●●●で発売
されている商品は素晴らしい
稀有かがあります。

FIG. 8
(a)  (b)  (c)
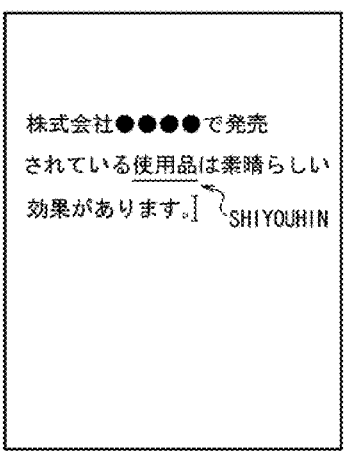 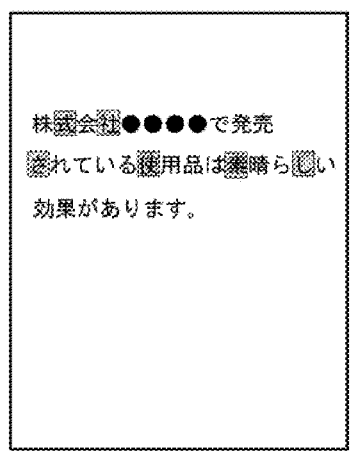 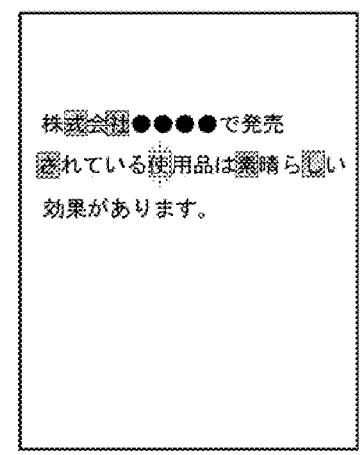
(d)  (e)  (f)
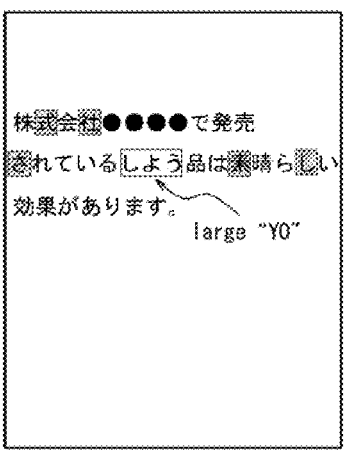 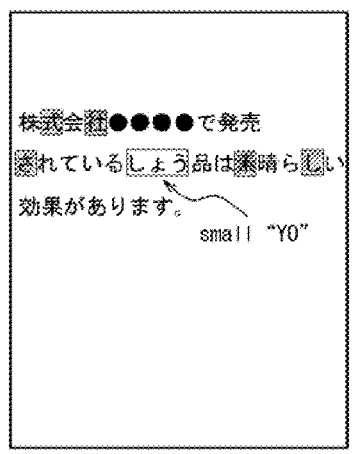 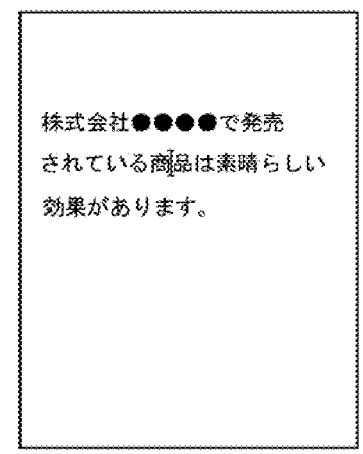

FIG. 9

(a) 株先会社●●●●で発売されている商品は素晴らしい効果があります。 KABUSAKI (b) 株式会社●●●●で発売されている商品は素晴らしい効果があります。

(c) 株先会社●●●●で発売されている商品は素晴らしい効果があります。

(d) 株さき会社●●●●で発売されている商品は素晴らしい効果があります。

(e) 株しき会社●●●●で発売されている商品は素晴らしい効果があります。

(f) 株式会社●●●●で発売されている商品は素晴らしい効果があります。

FIG. 10
(a)  (b)  (c)
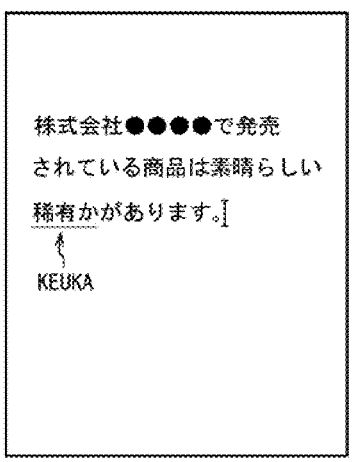 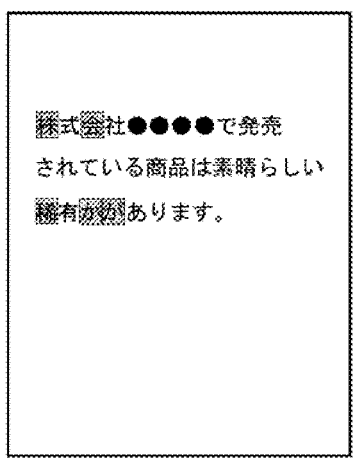 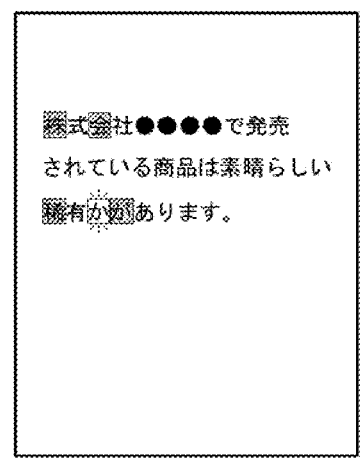
(d)  (e)  (f)
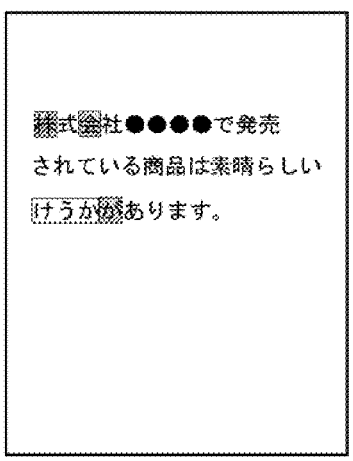 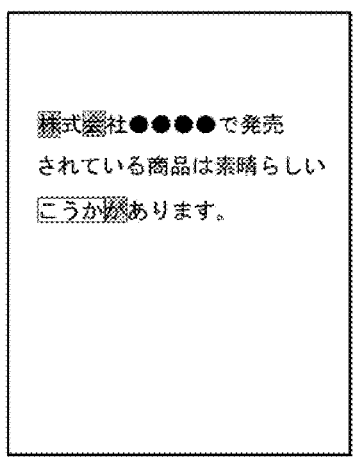 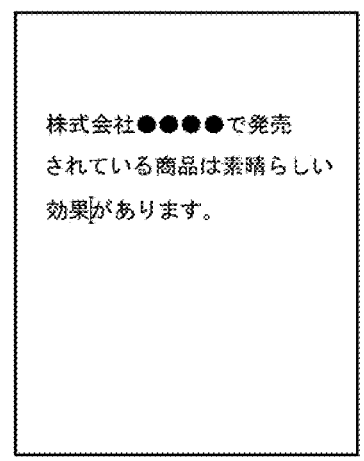

FIG. 12
(a)
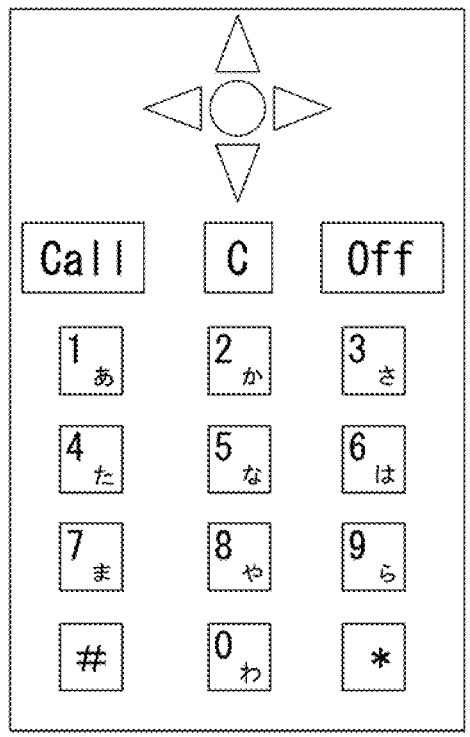
(b)
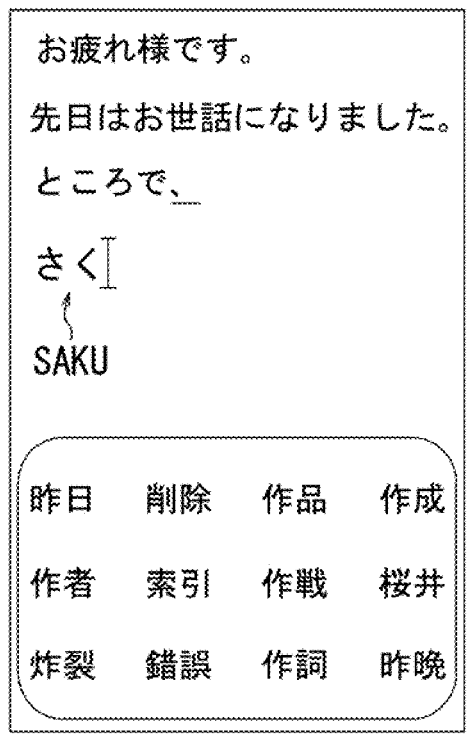

```
Hello.
Thank you for your kindness
the other day.
By the way
Yep̲t̲e̲rday
```

(b)

```
Hello.
Thank you for your kindness
the other day.
By the way
Yep̲t̲e̲rday
         (1)
         (2)
```

(c)

```
Hello.
Thank you for your kindness
the other day.
By the way
Yes̲terday
```

FIG. 16
(a)
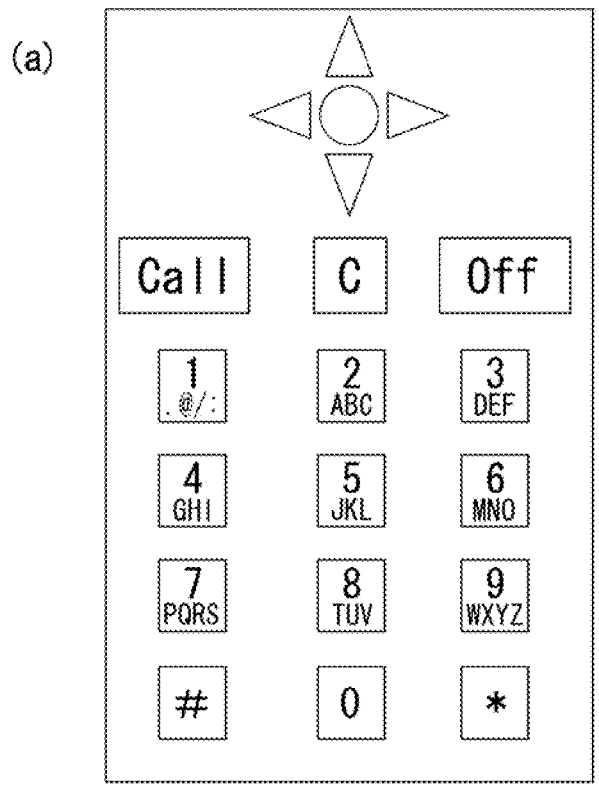
(b)
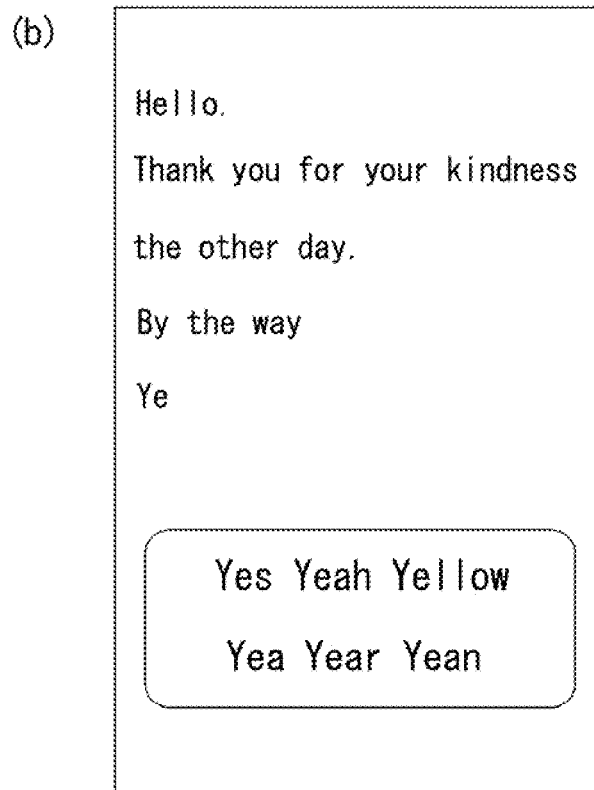

INPUT APPARATUS

CROSS REFERENCE TO RELATED APPLICATIONS

This application is a U.S. National Phase Application of International Application No. PCT/JP2008/065035 filed on Aug. 22, 2008, which claims priority to and the benefit of Japanese Patent Application No. 2007-217556 filed on Aug. 23, 2007, the whole contents of which are incorporated herein by reference.

TECHNICAL FIELD

The present invention relates to an input apparatus and, in particular, to an input apparatus for inputting characters.

BACKGROUND ART

Recently, as for mobile terminals such as cell phones, a wide variety of functions are incorporated in a compact terminal. Particularly, composition and transmission of an e-mail by use of a mobile terminal are widely carried out. When composing an e-mail by use of a mobile terminal, a user presses keys arranged on a terminal body or presses a touch panel to input characters and compose a text. In addition to composition of an e-mail, input of characters by use of a mobile terminal is very widely carried out in the case where the character information is inputted to an address book, a schedule book and the like, for example.

When a user inputs Japanese characters by use of operation keys of a cell phone, it is common to use a keyboard in which kana characters of each row are associated with each numeric key as shown in FIG. 12(a), for example. The following kana character input method of an e-mail is generally used today to input characters that compose an e-mail and the like by pressing such keys of a keyboard. That is, each row of kana characters from row "A" to "WA" is associated with each numeric key, such as row "A" consisting of "A", "I", "U", "E" and "O" of kana characters is associated with the key "1", row "KA" consisting of "KA", "KI", "KU", "KE" and "KO" to the key "2" and row "SA" to the key "3" and the like. In this method, when successive press of each numeric key by the user are accepted, according to the number of presses, kana characters of the corresponding row are sequentially changed and one character is inputted.

In the case where an e-mail text is composed by using such kana input method, it is common to perform an input operation with displaying the result of the input on a screen of the terminal as shown in FIG. 12(b), for example, by use of a Japanese input application installed on the terminal In the screen shown in FIG. 12(b), an area which shows the progress of input of the characters currently being inputted by the user on a segment basis is displayed on the middle part thereof and on the upper part thereof, the confirmed part of the inputted characters is displayed.

FIG. 12(b) shows a state where the user presses the key "3 (row "SA")" once among the keys on the keyboard shown in FIG. 12(a) to input "SA", which is the first character of row "SA", and then presses the key "2 (row "KA")" three times successively to change kana characters of row "KA" sequentially such as from "KA" to "KI" to "KU", thereby inputting "KU", which is the third character of row "KA". In response to the input of kana characters of "SAKU", selection candidates of various words starting from "SAKU" are displayed on the lower part of the screen shown in FIG. 12(b). Thus the user can select a candidate from among them and confirm it.

It is possible to occasionally convert the input kana characters into kanji (Chinese character) by repeating the input operation on a segment basis. In this manner, a text can be composed.

Incidentally, during such an input work, it's not always true that the user performs an input operation with watching a screen that displays the results of the input as shown in FIG. 12(b) all the time. In other words, for example, the user may turn his/her eyes away from the display screen in order to check the position of the key on the keyboard. Moreover, when the user performs an input operation with doing other things, for example, moving on foot or the like, it is not true that he/she can confirm the results of the input with watching the display screen all the time. Further, considering a faulty operation by the user using his/her finger, in the actual input operations, the need for performing an operation to correct inputting errors may arise constantly.

When the user makes an inputting error in the conventional input method, in order to correct it, the user moves a cursor to the portion to be corrected, then deletes the character of the portion to be corrected, for example, and inputs again a correct character.

For example, assume that the user inputs the kana characters of "KABUSHIKAKAISHA" by mistake as shown in the middle part of the display screen of FIG. 13(a) although he/she wants to input "KABUSHIKIKAISHA" (corporation), and after that he/she notices the inputting error. In this example shown in the figure, the cursor after input of a character or character string is in the shape of "I". Further, when the cursor is moved onto the character that has already been inputted, the cursor turns into a square shape and indicates a selected position of the character by inversed display or blinking Therefore, when the user wants to correct the character that has already been inputted, in order to move the cursor to the position of "KA" (which locates right before the character string of "KAISHA") the user wants to correct, he/she needs to press a LEFT arrow key of a cross key located on the upper part of the keyboard shown in FIG. 12(a) five times to put the display screen into the state as shown in FIG. 13(b). The numbers from (1) to (5) show the number of times the user presses the LEFT arrow key. As for the character input function of a cell phone, when a character is inputted in the middle of a sentence, in most cases the function is configured so that the input character is not "overwritten", but is "inserted". In such a case, the user moves the cursor to the portion which he/she wants to correct, deletes the character "KA" where the cursor is located by pressing a clear key such as a "C" key shown in FIG. 12(a), for example, and thereafter inputting a correct character "KI" as shown in FIG. 13(c) to carry out a correcting operation. Alternately, the user inputs a correct character and thereafter deleting the character he/she has inputted incorrectly.

On the other hand, in the English-speaking countries, in the case where characters are inputted by use of operation keys of a cell phone, it is common to use a keyboard in which alphabetical letters are associated with each numeric key as shown in FIG. 16(a). When a user inputs letters that compose an e-mail or the like by pressing such keys of the keyboard, the following alphabetical letter input method of an e-mail is generally used today. That is, alphabetical letters are associated with each numeric key such as, for example, "A", "B" and "C" to the key "2" and "D", "E" and "F" to the key "3". In this method, when successive presses of each numeric key by the user are accepted, according to the number of presses, the corresponding alphabetical letters are changed sequentially and one letter is inputted. In this method, the alphabetical letters are changed sequentially from capital letters to small letters such as "A", "B", "C", "a", b", "c", in that order.

In the case where an e-mail text is composed by use of such input method of alphabetical letters, it is common to perform an input operation with displaying the results of the input on a screen of the terminal as shown in FIG. 16(b) by use of an English input application installed on the terminal.

FIG. 16(b) shows the state where the user presses the key "9" three times among the keys on the keyboard shown in FIG. 16(a) to input "Y", which is the third letter, and then, presses the key "3" five times successively to change the alphabetical letters of "D", "E", "F", "d", "e" sequentially, thereby inputting "e", which is the fifth letter. In response to the input of the letters of "Ye", selection candidates of various words starting from "Ye" are displayed on the lower part of the screen shown in FIG. 16(b). Thus the user can select a candidate from among them and confirm it. It is possible to compose a text in English by repeating the input operation on a letter basis like this.

In this input method, for example, assume that the user inputs the letters of "Yepterday" by mistake as shown in the middle part of the display screen of FIG. 17(a) although he/she wants to input the letters of "Yesterday", and after that he/she notices the inputting error. In the example shown in the figure, the cursor after the input of a letter or letter string is in the shape of "I". Further, when the cursor is moved onto the letter that has already been inputted, the cursor turns into a square shape and indicate the selected position of the letter by inversed display or blinking Therefore, when the user wants to correct the letter that has already been inputted, in order to move the cursor to the position of "p" the user wants to correct, he/she needs to press a LEFT arrow key of a cross key located on the upper part of the keyboard shown in FIG. 16(a) seven times to put the display screen into the state as shown in FIG. 17(b). The numbers from (1) to (7) show the number of times the user presses the LEFT arrow key. As for the character input function of a cell phone, when a character is inputted in the middle of a sentence, in most cases the function is configured so that the input character is not "overwritten", but is "inserted". In such a case, the user moves the cursor to the portion where he/she wants to correct, deletes the character "p" where the cursor is located by pressing a clear key such as a "C" key shown in FIG. 16(a), for example, and thereafter inputting a correct character "s" as shown in FIG. 17(c) to carry out a correcting operation. Alternately, the user inputs a correct character and thereafter deleting the character he/she has inputted incorrectly.

However, as for the above described correcting operation, the longer the distance between the present cursor position and the position of the portion the user wants to correct becomes, the heavier the time-consuming tasks imposed on the user to carry out a key operation to move the cursor to the position of the portion the user wants to correct becomes.

As an apparatus that can deal with such a problem, there is an input apparatus described in Japanese Patent Application Laid-Open No. 01-130260, for example. The input apparatus searches, when a user inputs a character that he/she wants to correct into a search field, the character or the character string inputted in the field from a text.

SUMMARY OF INVENTION

Technical Problems

However, as for the technology described in the Japanese Patent Application Laid-Open No. 01-130260, each time the user wants to correct a character, he/she needs to input the character string that he/she wants to correct into the search field separately. In other words, the user bears a burden of inputting the character string he/she has inputted incorrectly again.

Therefore, an object of the present invention in view of such circumstances is to provide an input apparatus that can correct an inputted character quickly by a simple operation that imposes fewer burdens on the user.

Solutions to Problems

In order to achieve the above object, an input apparatus in accordance with claim 1 includes:

an input unit for accepting an input;

a display unit for displaying an input result to the input unit;

an input mode determination unit for determining whether the input to the input unit is a first input mode or a second input mode; and an input control unit for controlling, when the input to a key of the input unit is determined as the first input mode by the input mode determination unit, so that a plurality of characters assigned to the key are sequentially changed and displayed on the display unit as input character candidates in response to the input, and when the input to the key of the input unit is determined as the second input mode by the input mode determination unit, for searching characters corresponding to the characters assigned to the key among an inputted character string displayed on the display unit as correction character candidates, and controlling movement of a cursor displayed on the display unit to the correction character candidates searched in response to the input.

The invention in accordance with claim 2 is characterized in that, in the input apparatus according to claim 1, the input control unit controls the display unit to emphasis-display on the searched correction character candidates to be recognized in response to an input in the second input mode, and controls the cursor to move sequentially to the correction character candidates emphasis-displayed in response to a plurality of inputs in the second input mode.

The invention in accordance with claim 3 is characterized in that, in the input apparatus according to claim 1 or 2, the input mode determination unit determines an input whose duration of a press to a key of the input unit is within a predetermined time threshold as the first input mode, and determines an input whose duration of a press to a key of the input unit exceeds the predetermined time threshold as the second input mode.

The invention in accordance with claim 4 is characterized in that, in the input apparatus according to claim 1 or 2, the input mode determination unit determines an input whose duration of a press to a key of the input unit exceeds a predetermined time threshold as the first input mode, and determines an input whose duration of a press to a key of the input unit is within the predetermined time threshold as the second input mode.

The invention in accordance with claim 5 is characterized in that, in the input apparatus according to any one of claims 1 to 4, when the inputted character string is a kana character string before confirmation and the input to the key of the input unit is determined as the second input mode by the input mode determination unit, the input control unit searches, among the inputted character string displayed on the display unit, kana characters corresponding to the kana characters assigned to the key as the correction character candidates.

The invention in accordance with claim 6 is characterized in that, in the input apparatus according to any one of claims 1 to 4, when the inputted character string includes a kanji or a kana character after confirmation and the input to the key of the input unit is determined as the second input mode by the input mode determination unit, the input control unit searches, among the inputted character string displayed on the display unit, kana characters corresponding to the kana characters assigned to the key as the correction character candidates.

The invention in accordance with claim 7 is characterized in that, the input apparatus according to claim 6 further includes a storage unit for storing a correlation between each kanji and phonetic kana characters thereof, and the input control unit further searches, among the inputted character string displayed on the display unit, a kanji having phonetic kana characters starting from a kana character assigned to the key as a correction character candidate from the storage unit, and based on the correlation between each kanji and phonetic kana characters thereof stored in the storage unit, controls so that a correction character candidate onto which the cursor moves based on the second input mode is converted into kana characters representing a reading thereof and displayed on the display unit in an editable manner.

The invention in accordance with claim 8 is characterized in that the input apparatus according to claim 6 further includes a storage unit for storing history of kana characters used to input the character string, and the input control unit further searches, among the inputted character string displayed on the display unit, a kanji having phonetic kana characters starting from a kana character assigned to the key as a correction character candidate from the storage unit, and based on the history of kana characters used to input the character string stored in the storage unit, controls so that a correction character candidate onto which the cursor is moved based on the second input mode is returned to kana characters before confirmation and is displayed on the display unit in an editable manner.

The invention in accordance with claim 9 is characterized in that the input apparatus according to claim 6 further includes a storage unit for storing history of kana characters used to input the character strings and history of segments used to confirm the inputted character strings respectively, and the input control unit further searches, among the inputted character strings displayed on the display unit, a kanji having phonetic kana characters starting from a kana character assigned to the key as a correction character candidate from the storage unit, and based on the history of the kana characters used to input the character strings and the history of segments used to confirm the inputted character strings respectively, controls so that a correction character candidate onto which the cursor is moved based on the second input mode is returned to kana characters before confirmation on the segment basis and is displayed on the display unit in an editable manner.

BRIEF DESCRIPTION OF DRAWINGS

FIG. 6 is a diagram showing an example of a display screen that illustrates a correcting operation in accordance with a second embodiment;

FIG. 8 is a diagram showing an example of a display screen that illustrates a correcting operation in accordance with the third embodiment;

FIG. 9 is a diagram showing an example of a display screen that illustrates a correcting operation in accordance with a fourth embodiment;

FIG. 10 is a diagram showing an example of a display screen that illustrates a correcting operation in accordance with a fifth embodiment;

FIG. 12 is a schematic diagram showing an input unit and a display unit of Japanese characters in accordance with a conventional cell phone;

FIG. 13 is a diagram showing an example of a display screen that illustrates a correcting operation of inputted Japanese characters in accordance with the conventional cell phone;

FIG. 15 is a diagram showing the display screen that illustrates the correcting operation in accordance with the first embodiment for the case of English;

FIG. 16 is a schematic diagram showing the input unit and the display unit of English letters in accordance with the conventional cell phone.

DESCRIPTION OF THE PREFERRED EMBODIMENTS

Preferred embodiments of the present invention will now be described with reference to the accompanying drawings. It should be noted that while in each of the following embodiments, an explanation is given by taking a cell phone as an example of a terminal having an input apparatus according to the present invention, the input apparatus according to the present invention is not limited to a cell phone, but can be applied to any terminal having an input unit and a display unit such as a PDA (Personal Digital Assistant) and the like.

(First Embodiment)

Figure 1:
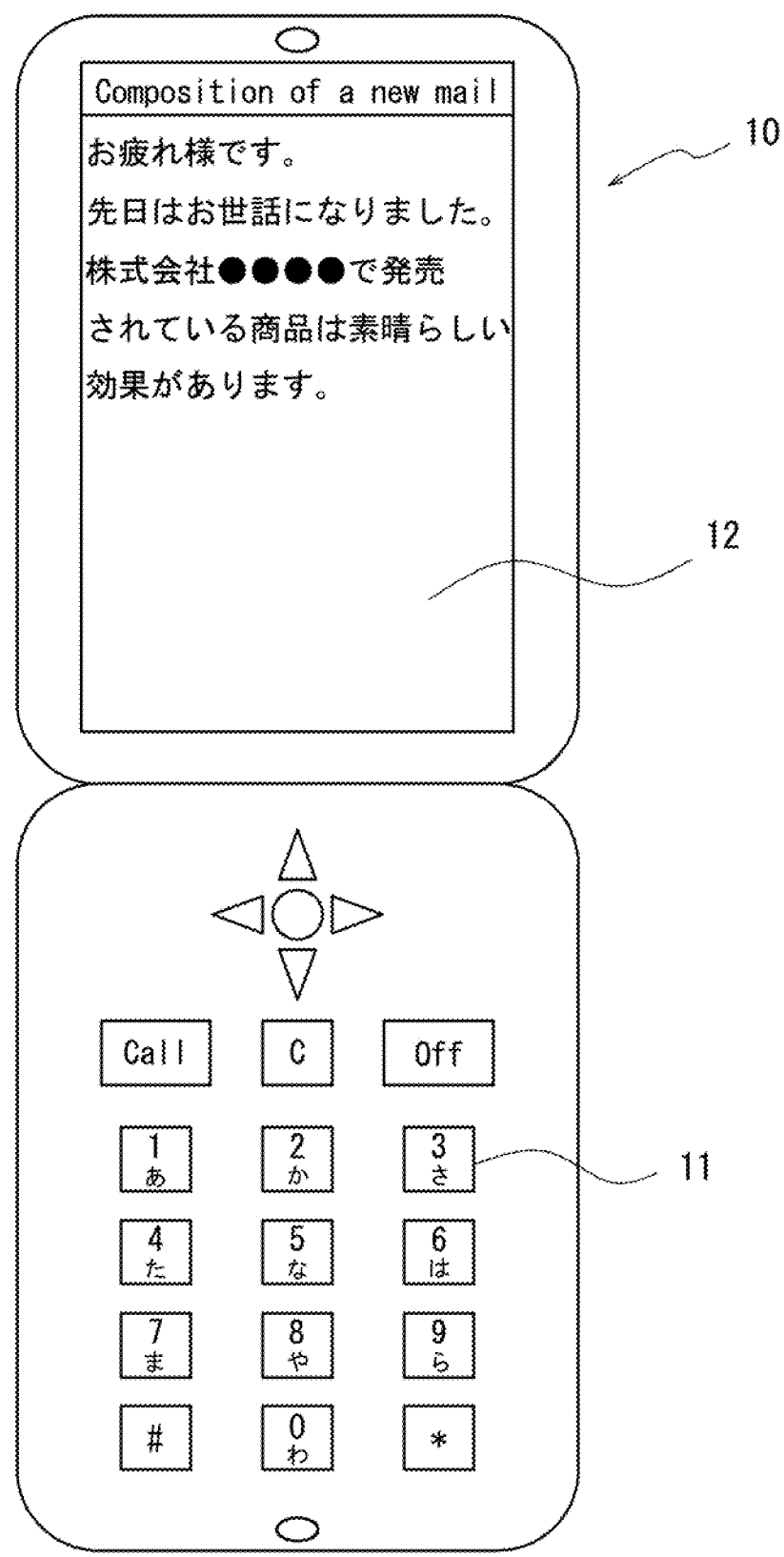
FIG. 1 is an exterior front view showing a configuration of a cell phone in accordance with a first embodiment of the present invention.

FIG. 1 is an exterior front view showing a configuration of a cell phone 10 in accordance with a first embodiment of the present invention. The cell phone 10 includes an input unit 11 constituted by a plurality of mechanical keys and the like disposed on a terminal and a display unit 12 constituted by, for example, a liquid crystal display for displaying a various kinds of information. In the present embodiment, the cell phone 10 is described as a cell phone having a folding-type housing. However, the present invention is not limited to a folding type of a cell phone, but can be applied to any terminal having an input unit and a display unit. FIG. 1 shows the situation where a user inputs characters that compose a text message in order to write a new email to transmit by use of the cell phone 10. The cell phone 10 includes, in addition to the above described units, function units such as a speaker and a microphone which are generally required for a cell phone and an interface and the like. However, the detailed explanations thereof are omitted.

Figure 2:
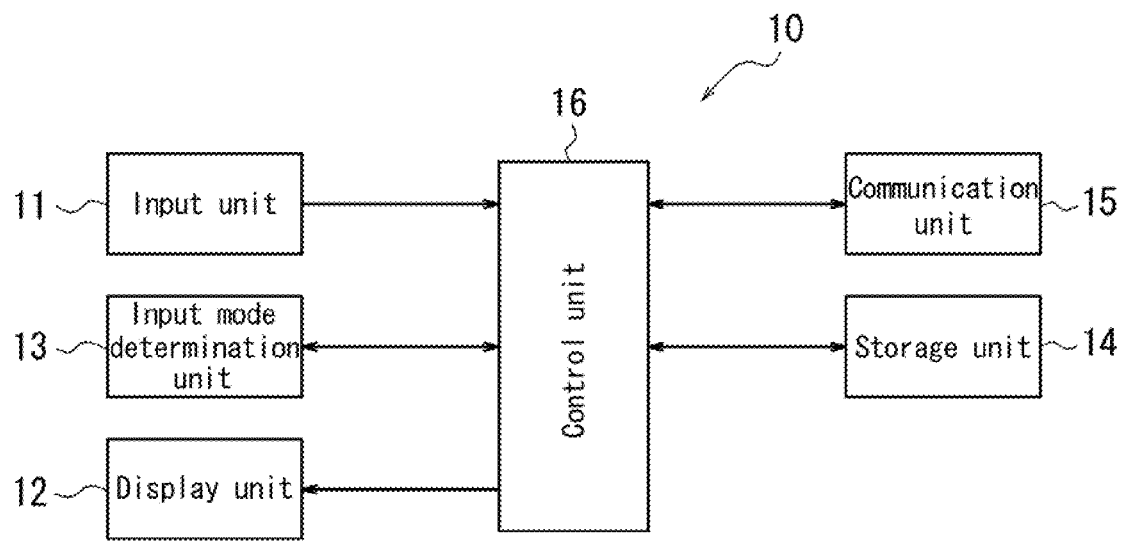
FIG. 2 is a functional block diagram of the cell phone shown in FIG. 1.

FIG. 2 is a functional block diagram of the cell phone 10 in accordance with the present embodiment. In addition to the input unit 11 and the display unit 12, the cell phone 10 further includes an input mode determination unit 13 for determining the input mode based on the timing of the input (length of the duration of a press) to the input unit 11, a storage unit 14 for storing a Japanese input application, kanji conversion candidates for kana to kanji conversion and a various kinds of information on settings and the like, a communication unit 15 for transmitting/receiving data to/from a base station (not shown) and a control unit 16 for controlling the overall cell phone 10 including these function blocks.

Figure 3:
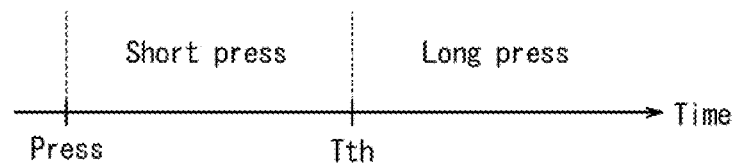
FIG. 3 is a conceptual diagram illustrating a "short press" and a "long press" of the first embodiment.

Hereinafter, determination of the input mode to the input unit 11 by the input mode determination unit 13 will be described. In the present embodiment, the input mode to the input unit 11 is determined as a "normal input operation" or a "correcting operation" by the input mode determination unit 13. For such determination, a time threshold Tth as shown in FIG. 3 is previously set and stored in the storage unit 14. When a key of the input unit 11 is released within the time threshold Tth after a press operation to the key was started, the press is determined as a "short press", and when a key is not released beyond the time threshold Tth after a press operation to the key was started, the press is determined as a "long press".

In the present embodiment, the "short press" is described as a "normal input operation" and the "long press" is described as a "correcting operation". In the present embodiment, when a short press of a key by the user is detected, the control unit 16 controls so that a kana character is inputted or changed as a normal input operation, and when a long press is detected, as a correcting operation, the kana characters associated with the key that are displayed on the display unit 12 are highlighted (emphasis display) and thereafter, when a long press is further detected, a cursor is moved onto the highlighted portion.

Figure 4:
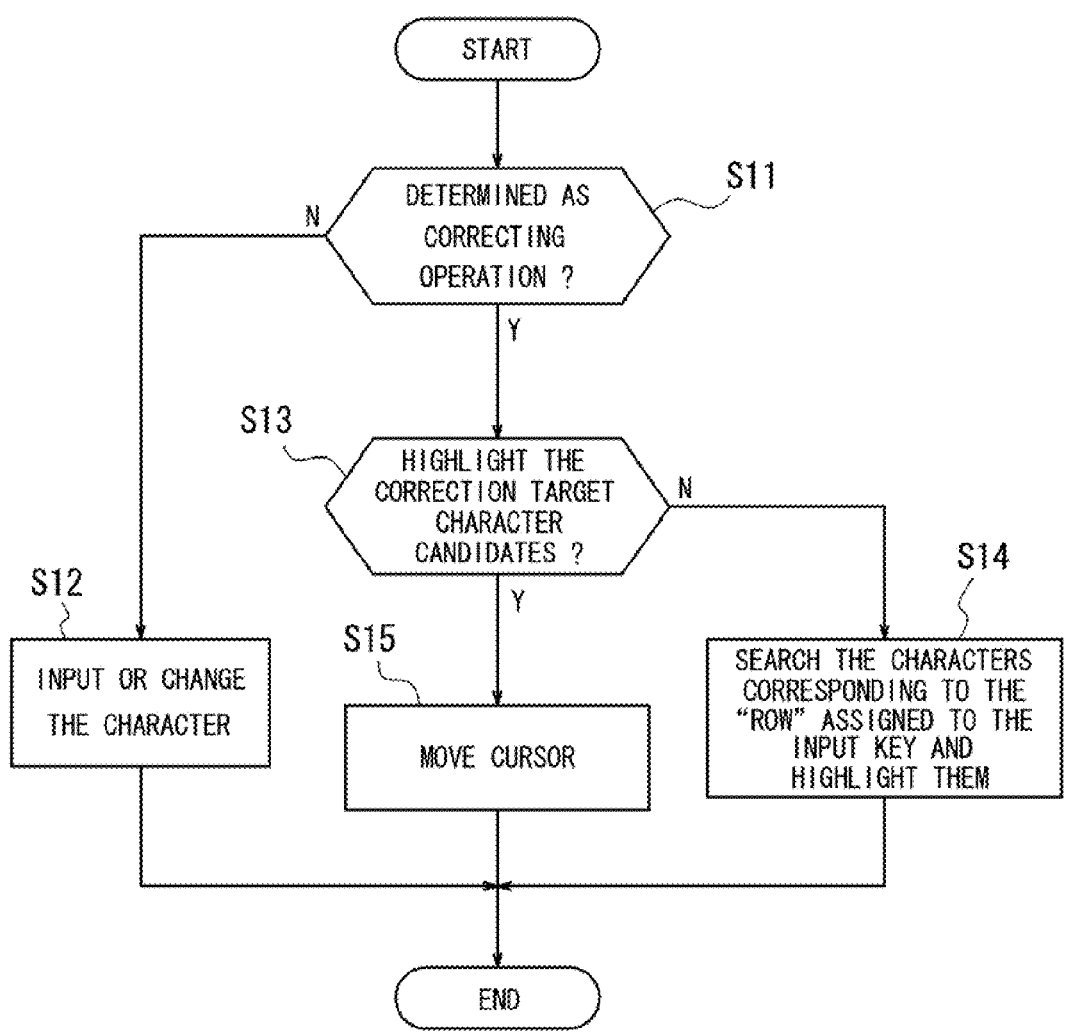
FIG. 4 is a flowchart illustrating an operation of the cell phone in accordance with the first embodiment.

Next, the normal input operation and the correcting operation of the cell phone 10 in accordance with the present embodiment are described with reference to a flowchart shown in FIG. 4. In the present embodiment, a description will be made about an operation in a case where during the input of a character string, the user notices an inputting error before converting the character string into a kanji, and therefore, the user wants to correct the error at a stage before selecting a conversion candidate of kanji and confirming a conversion into the kanji In the present embodiment, when a user makes an inputting error and presses long a key associated with a row of a kana character the user wants to correct (e.g. when the user wants to correct the character of "TE", since "TE" is a kana character of row "TA", the user presses the key "4 (row "TA")" long), the cell phone 10 accepts the user input as the correcting operation. Accordingly, the control unit 16 controls so that the kana characters assigned to the key which is pressed long are highlighted on the display unit 12 as correction target character candidates. The highlighted display of the correction target character candidates will be further described later.

First, when the input unit 11 detects a press of the key, the input mode determination unit 13 determines whether the detected input is the normal input operation by a short press or the correcting operation by a long press (step S11). As a result of that, when the input is determined as the normal input operation by a short press, the conventional kana character input (multi-tap input) processing based on the normal Japanese input application is performed (step S12).

As for the conventional kana character input processing, when a key of each row such as row "A", row "KA", row "SA" or the like is first pressed, the control unit 16 processes the press as an input of the first character of each row, which is, "A", "KA" "SA" respectively or the like and displays the kana character on the display unit 12. On the other hand, when the kana character of each row is already displayed on the display unit 12 and the input unit 11 detects a successive press based on the previous input of the key of the row, the control unit 16 controls so that the kana character of each row is changed to the next character and displayed on the display unit 12. In other words, if the key of row "A" is pressed when "A" is being displayed, the display is changed to "I", and if the key of row "A" is pressed when "I" is being displayed, the display is changed to "U".

When the input mode determination unit 13 determines that the input detected by the input unit 11 is the correcting operation by a long press at step S11, the control unit 16 checks whether the correction target character candidates have already been highlighted or not (step S13). In the case where the input by a long press is not made successively after a long press which has been made right before (in other words, in the case where the operation is shifted from the normal input operation to the correcting operation), highlighted displays of the correction target character candidates do not exist. Therefore the process moves to step S14. At step S14, the control unit 16 searches kana characters included in the row of kana characters assigned to the key that has been inputted as the correcting operation (e.g. in the case of the key "3 (row "SA")", "SA" "SHI", "SU", "SE" and "SO") from segments of kana characters before conversion currently being displayed on the display unit 12 with reference to the storage unit 14 and highlights the searched kana characters on the display unit 12.

In the case where the correction target character candidates have already been searched and highlighted at step S13 (because the correcting operation by a long press is performed for the second time or later), the cursor is moved to a highlighted correction target character candidate by the correcting operation (step S15). As for the movement of the cursor, the cursor is moved first to one correction target character candidate right before the position where the cursor was located at the time when the correcting operation was started, and then each time the correcting operation is repeated, the cursor is moved further to another correction target character candidate so that the cursor is moved sequentially away from the position where the cursor was located at the time when the correcting operation was started (that is, the cursor is moved sequentially from right to left or from bottom to top). Therefore, in the present embodiment, an input control unit is constituted by including the storage unit 14 and the control unit 16.

Figure 5:
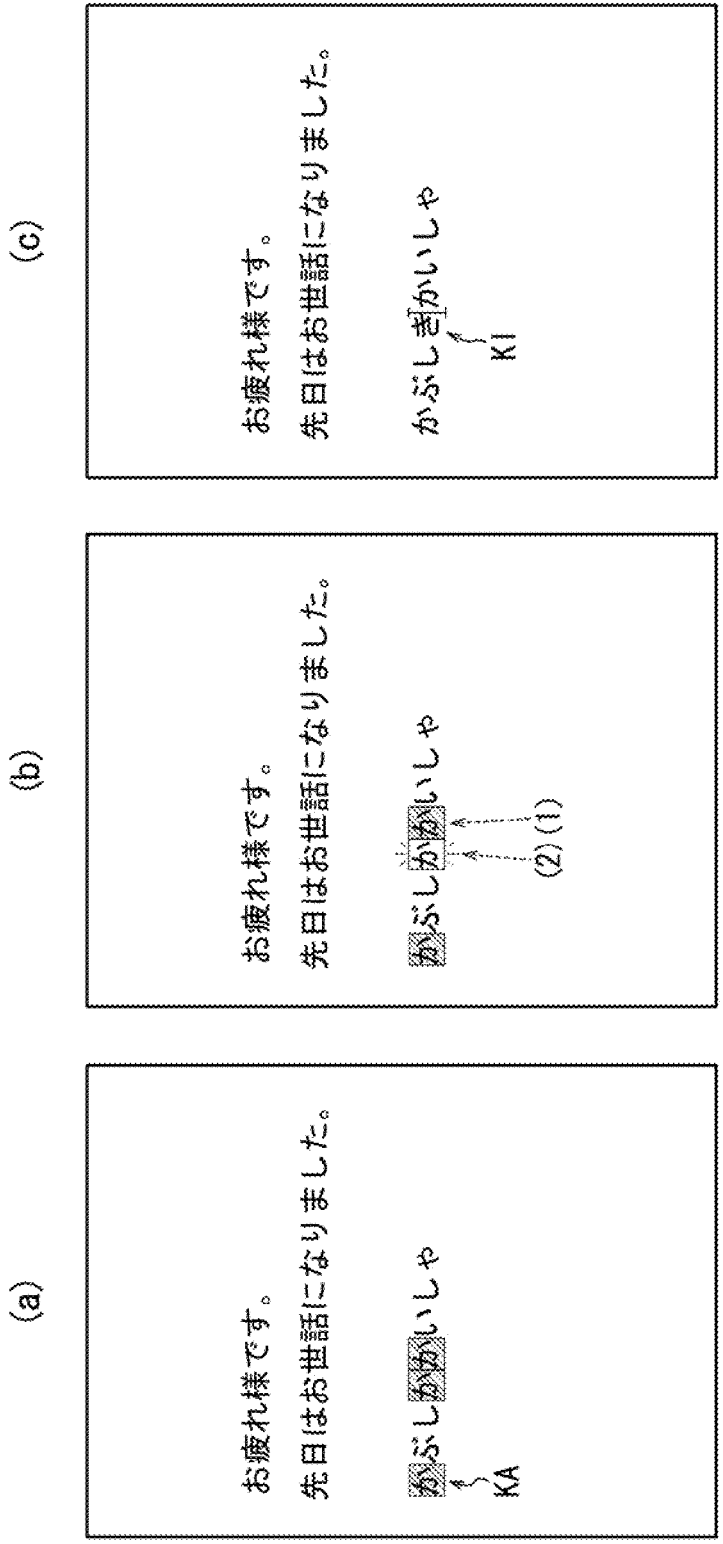
FIG. 5 is a diagram showing an example of a display screen that illustrates a correcting operation in accordance with first embodiment.

FIG. 5 is a diagram illustrating an operation of the cell phone 10 in accordance with the present embodiment. Each of FIGS. 5(a) to (c) shows an example of a screen displayed on the display unit 12 of the cell phone 10. As shown in the figure, when the user wants to input kana characters of "KABUSHIKIKAISHA" (corporation), for example, but inputs "KABUSHIKAKAISHA" by mistake, and then finding the inputting error before converting them into kanji, the user needs to correct the character "KA" to "KI". In this case, when a long press to the key "2 (row "KA")" of the input unit 11 is detected as the correcting operation, the control unit 16 searches kana characters of row "KA" and highlights them on the display unit 12 as shown in FIG. 5(*a*). After that, when a long press to the key "2 (row "KA")" is detected again, the cursor is moved to the character "KA" of "KAISHA", which is the first candidate of correction target character, and the location of the correction candidate is clearly indicated by blinking or inversed display. Then the cursor is moved to the character "KA" located right before "KAISHA" as shown in FIG. 5(*b*) since a long press to the key "2 (row "KA")" is detected again. Then when the normal input operation by a short press to the key "2 (row "KA") is detected, since in this case, the character "KA" is already displayed, the character "KA" is corrected to the character "KI" (display of the character is changed sequentially from "KA" to "KI"). Thus the user can complete this correcting operation as shown in FIG. 5(*c*).

Therefore, compared to the conventional mobile terminal illustrated in FIG. 13, first, a cursor can be moved to the desired position to be corrected by a fewer times of key operations (5 times in the example shown in FIGS. 13 and 3 times in the present embodiment). Further, without deleting the character the user wants to correct with a clear key or the like, the character can be corrected directly only by continuing the normal input operation. Therefore a considerable number of time-consuming tasks for the correcting operation can be reduced as a whole. In addition, the user can move a cursor and also correct a character only by pressing the same key successively (by changing the duration of press). Thus the user does not need to use a clear key for correction and therefore does not need to move his/her finger to another key. Thus correction of characters can be made efficiently.

(The First Embodiment for the Case of English)

Next, a case where the above described first embodiment is applied to an English input mode will be described below with reference to the drawings.

Figure 14:
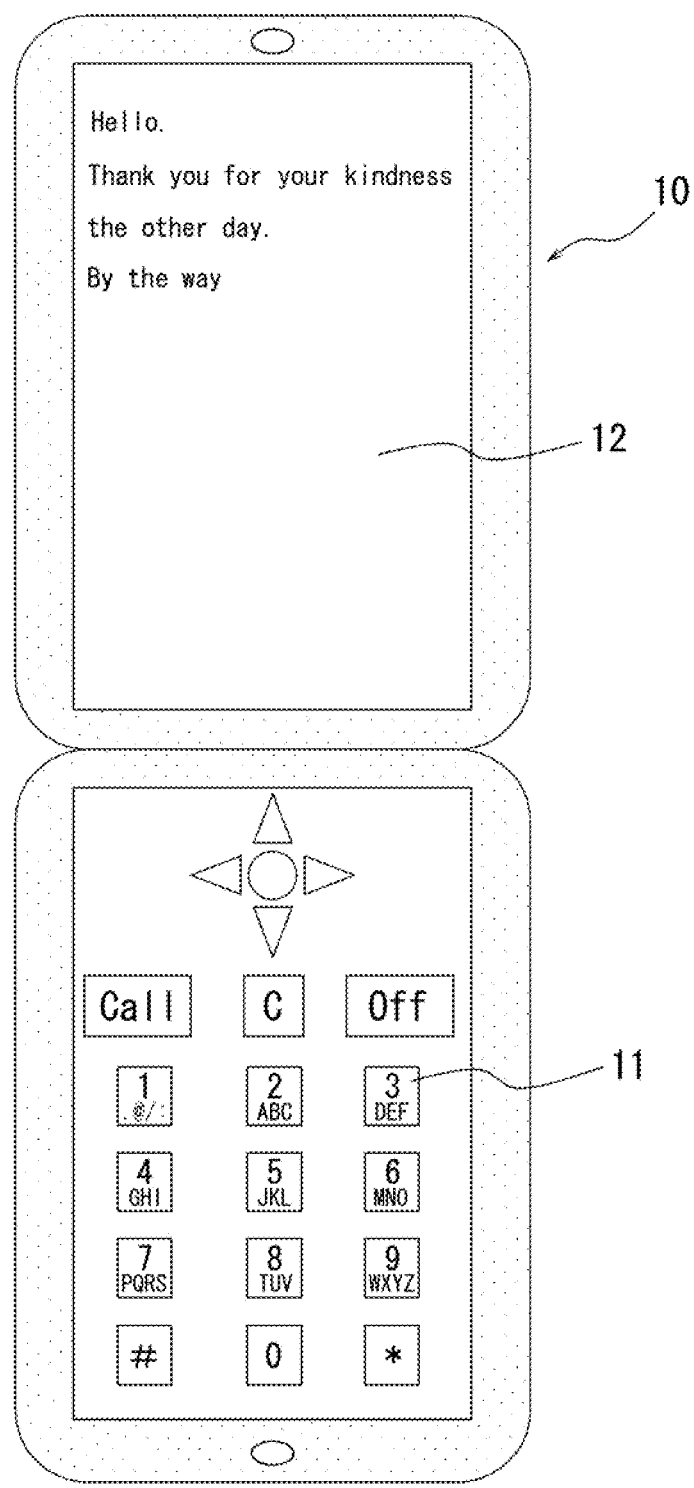
FIG. 14 is an exterior front view showing the configuration of the cell phone in accordance with the first embodiment of the present invention for the case of English.

FIG. 14 is an exterior front view showing a configuration of a cell phone 10 in accordance with a first embodiment of the present invention for the case of English. The cell phone 10 includes an input unit 11 constituted by a plurality of mechanical keys and the like disposed on the terminal and a display unit 12 constituted by, for example, a liquid crystal display for displaying a various kinds of information. In the present embodiment, the cell phone 10 is described as a cell phone having a folding-type housing. However, the present invention is not limited to a folding type of a cell phone, but can be applied to any terminal having an input unit and a display unit. FIG. 1 shows the situation where a user inputs letters that compose a text message in order to write a new email to transmit by use of the cell phone 10. The cell phone 10 includes, in addition to the above described units, function units such as a speaker and a microphone which are generally required for a cell phone and an interface and the like. However, the detailed explanations thereof are omitted.

FIG. 2 is a functional block diagram of the cell phone 10 in accordance with the present embodiment. In addition to the input unit 11 and the display unit 12, the cell phone 10 further includes an input mode determination unit 13 for determining the input mode based on the timing of the input (length of duration of a press) to the input unit 11, a storage unit 14 for storing an English input application, English word conversion candidates and a various kinds of information on settings and the like, a communication unit 15 for transmitting/receiving data to/from a base station (not shown) and a control unit 16 for controlling the overall cell phone 10 including these function blocks.

Hereinafter, determination of the input mode to the input unit 11 by the input mode determination unit 13 will be described. In the present embodiment, the input mode to the input unit 11 is determined as a "normal input operation" or a "correcting operation" by the input mode determination unit 13. In order to make such determination, the time threshold Tth as shown in FIG. 3 is previously set and stored in the storage unit 14. When a key of the input unit 11 is released within the time threshold Tth after a press operation to the key was started, the press is determined as a "short press", and when a key is not released beyond the time threshold Tth after a press operation to the key was started, the press is determined as a "long press".

In the present embodiment, the "short press" is described as a "normal input operation" and the "long press" is described as a "correcting operation". In the present embodiment, when a short press of a key by the user is detected, the control unit 16 controls so that a letter is inputted or changed as a normal input operation, and when a long press is detected, as a correcting operation, the letters associated with the key that are displayed on the display unit 12 are highlighted (emphasis display) and thereafter, when a long press is further detected, a cursor is moved onto the highlighted portion.

In the present embodiment for the case of English, the keys used to input alphabetical letters are associated with alphabetical letters as follows based on the English input application.

To input letters A, B and C, press the key "2" (for example, to input letter A, a user presses the key of number "2" once, for letter B, presses the key of number "2" twice successively and for letter C, presses the key of number "2" three times successively, and the same is applied to the following letters).

To input D, E and F, press the key "3".

To input G, H and I, press the key "4".

To input J, K and L, press the key "5".

To input M, N and O, press the key "6".

To input P, Q, R and S, press the key "7".

To input T, U and V, press the key "8".

To input W, X, Y and Z, press the key "9".

Small letters are displayed after capital letters are displayed sequentially. For example, each time the key of number "2" is pressed, in response to the press, letters are changed sequentially such as "A", "B", "C", "a", "b", "c", "A", "B", "C" . . . , in that order.

Next, the normal input operation and the correcting operation of the cell phone 10 in accordance with the present embodiment are described with reference to a flowchart shown in FIG. 4.

In the present embodiment, when the user makes an inputting error, and presses long a numeric key associated with a letter the user wants to correct (e.g. when the user wants to correct the letter "B", since the letter "B" is associated with the key "2", the user presses the key "2 (A, B, C)" long), the cell phone 10 accepts the user input as the correcting operation. Accordingly, the control unit 16 controls so that the letters assigned to the numeric key that is pressed long are highlighted on the display unit 12 as correction target letter candidates. The highlighted display of the correction target letter candidates will be further described later.

First, when the input unit 11 detects a press of the key, the input mode determination unit 13 determines whether the detected input is the normal input operation by a short press or the correcting operation by a long press (step S11). As a result of that, when the input is determined as the normal input operation by a short press, the conventional letter input (multi-tap input) processing based on the normal English input application is performed (step S12).

As for the conventional letter input processing, in the case where the key of each number such as "2", "3", "4" or the like is first pressed, the control unit 16 processes the press as an input of the first letter assigned to each numeric key, which is "A", "D", "G" or the like, and displays the letter on the display unit 12. On the other hand, in the case where the letter assigned to each numeric key is already displayed on the display unit 12 and the input unit 11 detects a successive press based on the previous input of the numeric key, the control unit 16 controls so that the letter assigned to the numeric key is changed to the next letter and displayed on the display unit 12. In other words, if the numeric key "2" is pressed when the letter "A" is being displayed, the display is changed to "B", and if the numeric key "2" is pressed when "B" is being displayed, the display is changed to "C".

When the input mode determination unit 13 determines that the input detected by the input unit 11 is the correcting operation by a long press at step S11, the control unit 16 checks whether the correction target letter candidates have already been highlighted or not (step S13). In the case where the input by a long press is not made successively after the long press which has been made right before (in other words, in the case where the operation is shifted from the normal input operation to the correcting operation), highlighted displays of the correction target letter candidates do not exist.

Therefore the process moves to step S14. At step S14, the control unit 16 searches letters assigned to the numeric key that has been inputted as the correcting operation (e.g. in the case of the key "3 (D, E, F)", "D", "E" and "F") from the letters currently being displayed on the display unit 12 with reference to the storage unit 14 and highlights the searched letters on the display unit 12.

In the case where the correction target letter candidates have already been searched and highlighted at step S13 (because the correcting operation by a long press is performed for the second time or later), the cursor is moved to a highlighted correction target letter candidate by the correcting operation (step S15). As for the movement of the cursor, the cursor is moved first to one correction target letter candidate right before the position where the cursor was located at the time when the correcting operation was started, and then each time the correcting operation is repeated, the cursor is moved further to another correction target character candidate so that the cursor is moved sequentially away from the position where the cursor was located at the time when the correcting operation was started (that is, the cursor is moved sequentially from right to left or from bottom to top). Therefore, in the present embodiment, an input control unit is constituted by including the storage unit 14 and the control unit 16.

FIG. 15 is a diagram illustrating an operation of the cell phone 10 in accordance with the present embodiment. Each of FIGS. 15(a) to (c) shows an example of a screen displayed on the display unit 12 of the cell phone 10. As shown, when the user wants to input an English word of "Yesterday", for example, but inputs "Yepterday" by mistake, and thereafter finding the inputting error, the user needs to correct the letter "p" to "s". In this case, when a long press to the key "7 (P, Q, R, S)" of the input unit 11 is detected as the correcting operation, the control unit 16 searches the letters associated with the numeric key "7" and highlights them on the display unit 12 as shown in FIG. 15(a). After that, when a long press of the key "7 (P, Q, R, S)" is detected again, the cursor is moved to the letter "r" of "Yepterday", which is the first candidate of correction target letter, and the location of the correction candidate is clearly indicated by blinking or inversed display. Then when a long press to the key "7 (P, Q, R, S)" is detected again, the cursor is moved to the letter "p" of "Yepterday" as shown in FIG. 15(b). Next, when the normal input operation by a short press of the key "7 (P, Q, R, S)" is detected, since the letter "p" is already displayed, the latter "p" is changed, and by detection of a short press three times the letter "p" is corrected to the letter "s" (display of the letter is changed from "p" to "s" sequentially). In this way, the user can complete this correcting operation as shown in FIG. 15(c). In addition to "Yepterday", the highlighted display shown in FIG. 15(a) may be performed, for example, with respect to "r" of "other" and "s" of "kindness".

Figure 17:
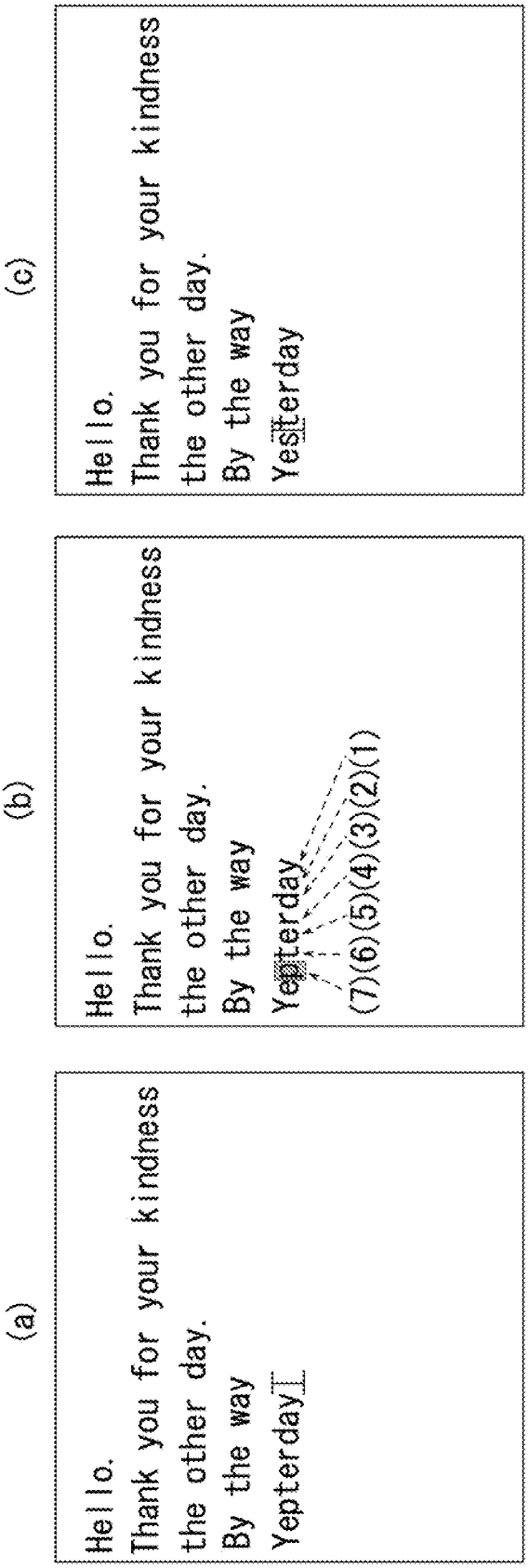
FIG. 17 is a diagram showing an example of the display screen that illustrates the correcting operation of inputted English letters in accordance with the conventional cell phone.

Therefore, compared to the conventional mobile terminal illustrated in FIG. 17, first, a cursor can be moved to the desired position to be corrected by a fewer times of key operations (7 times in the example shown in FIGS. 17 and 3 times in the present embodiment). Further, without deleting the letter the user wants to correct with a clear key or the like, the letter can be corrected directly only by continuing the normal input operation. Therefore a considerable number of time-consuming tasks for the correcting operation can be reduced as a whole. In addition, the user can move a cursor and also correct a character only by pressing the same key successively (by changing the duration of press). Thus the user does not need to use a clear key for correction and therefore does not need to move his/her finger to another key. Thus letter correction can be made efficiently.

(Second Embodiment)

Next, a second embodiment of the present invention will be described. In the first embodiment for Japanese characters described above, the description was made about the operation in the case where the user noticed the inputting error before conversion into a kanji during input of characters and made correction before confirming the conversion into a kanji. In the second embodiment, a description will be made, for example, about an operation in a case where a user does not notice an inputting error during the input, and notices the error and makes correction after selecting a kanji conversion candidate and confirming the candidate. The present embodiment can be implemented with the same configuration as that of the cell phone 10 in accordance with the first embodiment. In this case, however, only control of some function blocks is a little bit different. Therefore, the descriptions that are the same as those for the first embodiment are omitted.

For the cell phone 10 in accordance with the present embodiment, when the input mode determination unit 13 determines that the correcting operation by a long press is inputted to the input unit 11 after an inputted character string is confirmed, the control unit 16 searches the kana characters included in the row of kana characters assigned to the key that is used for the input and highlights the kana characters that have been searched on the display unit 12 as in the case of the above described first embodiment. Therefore, if the user presses long the key of the row that includes the kana character located before (or after) the character string of the kanji that the user wants to correct as the correcting operation, he/she can move the cursor to the position which is nearest to the portion to be corrected with a simple operation.

FIG. 6 is a diagram illustrating the operation of the cell phone 10 in accordance with the present embodiment. Each of FIGS. 6(a) to (d) shows an example of the screen displayed on the display unit 12 of the cell phone 10. In this example, the correcting operation in the case where the user intends to input a sentence of "the product being sold by the corporation~has a great effect" in Japanese, but inputs kana characters "KEUKA" for "KOUKA" (effect) by mistake, and thereafter performs confirmation processing without noticing that the characters have been converted into the character string of "KEUKA", not "KOUKA" as shown in FIG. 6(a).

First, in this case, in order to move the cursor to the kana character "I" right before the character string of "KEUKA", a user presses long the key "1 (row A)" to which "I" belongs. The control unit 16 detects this correcting operation and highlights all kana characters of "row A" that are displayed on the display unit 12 as shown in FIG. 6(b).

Thereafter, when a plurality of successive long presses to the key "1 (row A)" are detected, the control unit 16 moves the cursor to the position of "I" (located right before "KEUKA") which is highlighted as shown in FIG. 6(c). At this stage, since it is a mode for correcting the character "I", if the user continuously performs the normal input operation by a short press of the key "1 (row A)", the character "I" will be changed sequentially to "U", "E" and "O". Therefore, in this case, after the cursor is moved to "I", the user performs an input operation by use of the "RIGHT" key of the cross key. When the input operation is detected, the control unit 16 moves the cursor as shown in FIG. 6(d) to cancel the mode of changing the character "I". Thereafter, in accordance with the normal input operation, the character string of "KEUKA" may be deleted by use of a clear key after the character string of "KOUKA" is inputted, or inversely, "KEUKA" may be deleted first and thereafter "KOUKA" may be inputted.

In order to correct the character string of "KEUKA" that has been inputted incorrectly from the position right after the character string, the user may perform the correcting operation by pressing the key "2 (row KA)" long to move the cursor to the kana character of "GA" right after "KEUKA" and then correct the character string of "KEUKA".

As described above, the correcting operation in accordance with the first embodiment can be applied to the correcting operation after confirmation of a character with a few changes, and thereby, even after inputted characters have been confirmed, a user can correct the inputted character string quickly through a simple and efficient operation that requires fewer steps.

(Third Embodiment)

Next, a third embodiment of the present invention will be described. In the third embodiment, a description will be made about an operation for correcting an error more simply and efficiently, for example, in a case where a user does not notice an inputting error during input but notices the inputting error after selecting and confirming a kanji conversion candidate, as in the case of the above described second embodiment. The present embodiment can be performed with the same configuration as that of the cell phone 10 in accordance with the first and the second embodiments. In this case, however, only control of some function blocks is a little bit different. Therefore, the descriptions similar to those of the first and the second embodiments are omitted.

For the cell phone 10 in accordance with the present embodiment, the function of kana-kanji conversion that is included in the Japanese input application stored previously in the storage unit 14 is applied. The cell phone 10 uses the function of Japanese input application stored in the storage unit 14 to enable a user to convert inputted kana characters into a kanji by selecting an appropriate conversion candidate from among several kanji conversion selection candidates after inputting a character string in kana characters. In the present embodiment, the function for converting from kana into kanji is used in an inverse manner, and in the case where the character to which the cursor is moved by the correcting operation is kanji, the control unit 16 displays kana characters that corresponds to the kanji on the display unit 12 based on the correlation used for kana-kanji conversion.

The normal input operation and the correcting operation of the cell phone 10 in accordance with the present embodiment are described below with reference to the flowchart shown in FIG. 7. Since this flowchart is similar to that of FIG. 4, descriptions similar to those given for FIG. 4 are omitted.

In the present embodiment, when the input mode determination unit 13 determines that the correcting operation by a long press is inputted to the input unit 11 at step 31 after the inputted character string has been confirmed, the control unit 16 searches kana characters included in the row assigned to the key used for the input and kanji having phonetic kana characters starting from the kana character included in the row assigned to the key used for the input and highlights the searched kana characters and kanji on the display unit 12 (step S34). Thereafter when the correcting operation by a long press is detected (Yes at step S31, Yes at step S33), the control unit 16 moves the cursor to the highlighted correction character candidates sequentially (step S35), and in the case where a character to which the cursor is moved is a kanji (step S36), displays phonetic kana characters corresponding to the kanji on the display unit 12 (step S37) at the point of time when the cursor is moved onto the kanji. Thereafter, by detection of the normal input operation by a short press, the cell phone 10 can correct the kana character that has been inputted incorrectly by the user to the correct kana character and convert it to kanji again.

When the correcting operation by a long press is performed more than once, the cursor is moved to a plurality of correction character candidates accordingly. In the case where the kanji of the correction character candidate located on the position where the cursor is located currently has already been displayed as phonetic kana characters, the display is returned to the kanji and thereafter the cursor is moved to the next correction character candidate.

FIG. 8 is a diagram illustrating an operation of the cell phone 10 in accordance with the present embodiment. Each of FIGS. 8(a) to (f) shows an example of the screen displayed on the display unit 12 of the cell phone 10. Here, a description will be made about an correcting operation in a case where the user intends to input a sentence of "the product being sold by the corporation~has a great effect" in Japanese by use of the key of the input unit 11, but inputs kana characters "SHIYOUHIN" by mistake although he/she wants to input "SHOUHIN" (product), and then performs the confirming processing without noticing conversion into a kanji character string of "SHIYOUHIN", not "SHOHIN" as shown in FIG. 8(a).

First, in this case, in order to move the cursor to the first kanji of "SHI" in the kanji character string of "SHIYOUHIN", the user presses long the key "3 (row SA)" to which the kana character "SHI" belongs as the correcting operation. When the long press is detected, the control unit 16 highlights all of the kanji having phonetic kana characters starting from "row SA" and the kana characters of "row SA" displayed on the display unit 12, as shown in FIG. 8(b).

Next, when the user presses long the key "3 (row SA)" several times, the control unit 16 moves the cursor, in response to the detection of the long press, to the highlighted position of "SHI", as shown in FIG. 8(c). With respect to the specifications of the kana-kanji conversion function of the Japanese input application stored in the storage unit 14, in the case where conversion candidates such as kanji characters meaning "use", "specifications", "trial" and "private business" are correlated with the reading of "SHIYOU" in kana, for example, when the cursor is moved to the position of "SHI" as shown in FIG. 8(d), phonetic kana characters "SHIYOU" are displayed on the display unit 12 with respect to the character string of "use" in kanji that includes the kanji character "SHI".

Thereafter, to the character string of "SHIYOU", when the normal input operation by a short press is detected continuously, the control unit 16 changes the character string to "SHOU" as shown in FIG. 8(*e*). More specifically, it may be considered that the user moves the cursor to the position of "large YO" with a cross key and inputs a "small YO" by the normal input operation. Then the user can perform kana-kanji conversion once again to the character string "SHOU", which is correct input, and thereby convert the characters correctly into the kanji character "SHOU" as shown in FIG. 8(*f*).

As described above, the kana-kanji conversion function of the Japanese input application stored previously in the storage unit 14 is applied, and thereby, even after the inputted characters are confirmed, a user can correct the inputted character string quickly through a simple and efficient operation that requires fewer steps.

(Forth Embodiment)

Next, a fourth embodiment of the present invention will be described. In the fourth embodiment, a description will be made about an operation for correcting an error more simply and efficiently in a case where a user does not notice an inputting error during the input but notices the inputting error after selecting and confirming a kanji conversion candidate, for example, as in the case of the third embodiment described above. The present embodiment can be implemented with the same configuration as that of the cell phone in accordance with the first to the third embodiments. In this case, however, only control of some function blocks is a little bit different. Therefore, the descriptions similar to those of the first to the third embodiments are omitted.

In the present embodiment, when the user finds the inputting error after confirming the inputted characters and moves the cursor to the position of the kanji of the correction character candidate by the correcting operation by a long press, phonetic kana characters of the kanji are displayed, which is the same as in the case of the above described third embodiment. However, as for the phonetic kana characters, not kana characters corresponding to the kanji based on the correlation used for the kana-kanji conversion stored previously but kana characters based on the history of characters that have been inputted by the normal input operation of the user (before noticing the inputting error) are used.

In the cell phone 10 in accordance with the present embodiment, the control unit 16 controls so that the history of the kana characters used to input characters when the normal input operation is performed is stored in the storage unit 14. For example, in the case where the character string of "the product being sold by the corporation~has a great effect" has been inputted and confirmed in Japanese, as the kana characters used for the input of the characters, the history of "KABUSHIKIKAISHA~DE HATSUBAI SARETEIRU SHOUHIN HA SUBARASHII KOUKA GA ARIMASU." is stored in the storage unit 14 by correlating them with the characters displayed on the display unit 12. In the present embodiment, when the character to which the cursor is moved by the correcting operation is kanji, with reference to the history of kana characters stored in the storage unit 14 as described above, phonetic kana characters corresponding to the kanji are displayed on the display unit 12 based on the history of the kana characters that have been inputted.

Figure 7:
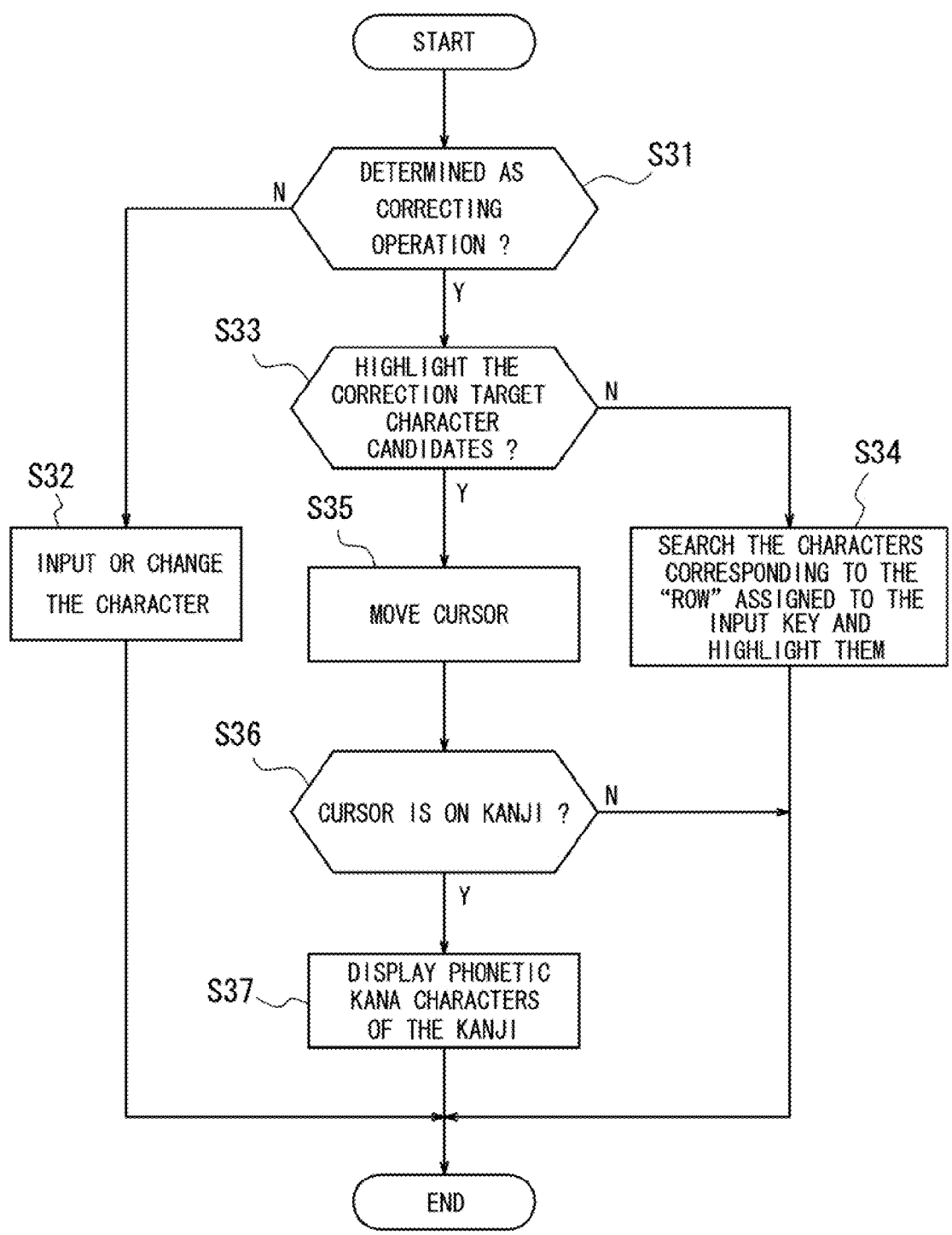
FIG. 7 is a flowchart illustrating an operation of a cell phone in accordance with a third embodiment.

Since the operation in accordance with the present embodiment can be performed at the same steps as the operation in accordance with the third embodiment described by the flowchart in FIG. 7, the same descriptions will be omitted. When the cursor moves onto the kanji and phonetic kana characters corresponding to the kanji are displayed at steps S36 and S37 of FIG. 7, the control unit 16 reads out the phonetic kana characters corresponding to the kanji onto which the cursor is moved from the history of the inputted kana characters that have been stored in the storage unit 14 and displays the kana characters on the display unit 12.

FIG. 9 is a diagram illustrating an operation of the cell phone 10 in accordance with the present embodiment. Each of FIGS. 9(*a*) to (*f*) shows an example of the screen displayed on the display unit 12 of the cell phone 10. Here, the explanation of the correcting operation is given for a case where the user intends to input a sentence of "the product being sold by the corporation~has a great effect" in Japanese by using the keys of the input unit 11, but he/she inputs kana characters "KABUSAKI" by mistake although he/she wants to input "KABUSHIKI" (a part of "corporation"), and thereafter performs confirmation processing without noticing that the input has been converted to kanji characters "KABUSAKI", not to "KABUSHIKI".

First, in this case, in order to move the cursor to "SAKI", which is an incorrect kanji among the kanji character string of "KABUSAKIKAISHA" (corporation), the user presses long the key "3 (row SA)", which is the row to which the first character "SA" of the reading of "SAM" belongs. When the correction operation is detected, the control unit 16 highlights, as shown in FIG. 9(*b*), all of the kanji having phonetic kana characters starting from "row SA" and the kana characters of "row SA" displayed on the display unit 12.

Next, when a long press of the key "3 (row SA)" is further detected, the controls unit 16 moves the cursor to the position of "SAM", which is highlighted as shown in FIG. 9(*c*). When the cursor is moved to the position of "SAKI", as shown in FIG. 9(*d*), phonetic kana characters of the kanji character of "SAM" are displayed on the display unit 12.

Thereafter, to the kana character string of "SAM", the normal input operation by a short press is continuously detected, and thereby the control unit 16 corrects the character string to "SHIM" as shown in FIG. 9(*e*). Kana-kanji conversion is performed once again to the kana character string of "SHIM" that has been inputted correctly, thereby converting to kanji "SHIM" as shown in FIG. 9(*f*).

As described above, the input history of kana characters by the normal input operation before confirmation of the inputted characters is stored in the storage unit 14 and the history is used for the correcting operation. Therefore, even after confirmation of the inputted characters, a user can correct the inputted character string quickly with a simple and efficient operation that requires fewer steps.

(Fifth Embodiment)

Next, a fifth embodiment of the present invention will be described. In the fifth embodiment, a description will be made about an operation for correcting an error more simply and efficiently in a case where a user does not notice an inputting error during the input and notices the inputting error after selecting and confirming a kanji conversion candidate, for example, as in the case of the fourth embodiment described above. The present embodiment can be implemented with the same configuration as that of the cell phone in accordance with the first to the fourth embodiments. In this case, however, only control of some function blocks is a little bit different. Therefore, the descriptions similar to those of the first to the fourth embodiments are omitted.

In the present embodiment, when the user finds the inputting error after confirming the inputted characters and moves the cursor to the position of the kanji of the correction character candidate by the correcting operation by a long press, phonetic kana characters for the kanji are displayed, which is the same as in the case of the above described third embodiment. However, in the present embodiment, in addition to the history of the characters that have been inputted by the normal input operation of the user (before he/she notices the inputting error) as described in the fourth embodiment, the history of the segments used when the characters are inputted by the normal input operation are used as well.

In the cell phone 10 in accordance with the present embodiment, the control unit 16 controls so that the history of the kana characters used to input characters during the normal input operation are stored in the storage 14 with the history of the segments used for the input. For example, when the character string of "the product being sold by the corporation~has a great effect" has been inputted and confirmed in Japanese, the history of "KABUSHIKIKAISHA—DE HATSUBAI SARETEIRU SHOUHIN HA SUBARASHII KOUKA GA ARIMASU." is stored as kana characters used for the input of the characters in the storage unit 14 on the basis of segment by which the character string is selected and confirmed during the normal input operation. For example, when the part where the user confirms the inputted character string as one unit is indicated by the symbol "/", the above sentence is indicated, for example, as "KABUSHIKI/KAISHA/~/DE/HATSUBAI/ SARETEIRU/SHOUHIN/HA/SUBARAS HII/KOUKA/ GAARIMASU".

Such history on the basis of segment is stored in the storage unit 14 by correlating with the characters displayed on the display unit 12. In the present embodiment, when the character to which the cursor is moved by the correcting operation is a kanji, the control unit 16 refers to the history of the kana characters stored in the storage unit 14 on the basis of segment as described above, and based on the history of inputted kana characters on the basis of segment, displays phonetic kana characters corresponding to the kanji on the display unit 12 on the basis of segment.

Since the operation of the present embodiment can be performed at the same steps as those for the operation of the third and the fourth embodiments described by the flowchart in FIG. 7, the same descriptions will be omitted. When the cursor is moved onto the kanji and phonetic kana characters corresponding to the kanji are displayed at steps S36 and S37 in FIG. 7, the control unit 16 reads out the phonetic kana characters corresponding to the kanji to which the cursor is moved from the history of the kana characters that have been stored on the basis of segment in the storage unit 14 and displays the kana characters on the display unit 12.

FIG. 10 is a diagram illustrating an operation of the cell phone 10 in accordance with the present embodiment. Each of FIGS. 10(a) to (f) shows an example of the screen displayed on the display unit 12 of the cell phone 10. Here, a description will be made about the correcting operation in the case where a user intends to input a sentence of "the product being sold by the corporation~has a great effect" in Japanese by use of the key of the input unit 11, but inputs kana characters "KEUKA" by mistake although he/she wants to input "KOUKA" (effect), and performs the confirming processing without noticing the conversion into a character string of "KEUKA", not "KOUKA" as shown in FIG. 10(a) is described.

First, in this case, in order to move the cursor to the incorrect character, which is, "KE", "U" or "KA" of the character string of "KEUKA", the user presses long the key of "2 (row KA)" or "1 (row A)" to which a phonetic kana character thereof, such as "KE", "U" or "KA" belongs. When the correcting operation is detected, all of the kanji having phonetic kana characters starting from the row and kana characters of the row displayed on the display unit 12 are highlighted. For the cell phone 10 in accordance with the present embodiment, a correction character candidate can be returned to kana characters on the basis of segment. Therefore, in the case where the user recognizes that he/she has inputted "KEUKA" as one segment although he/she wants to input "KOUKA", he/she may carry out a correcting operation to any character among "KEUKA". In this example, an explanation is given on the assumption that the key "2 (row KA)" is pressed long. When the correcting operation is detected, all of the kanji having phonetic kana characters starting from the "row KA" and kana characters of "row KA" displayed on the display unit 12 are highlighted as shown in FIG. 10(b).

Next, when a long press to the key "2 (row KA)" is further detected several times, as shown in FIG. 10(c), the cursor is moved to the position of "KE" or "KA" which is highlighted, according to the number of inputs by a long press. In this example, when the cursor is moved to the position of "KA", on the basis of segment, phonetic kana characters of the "KEUKA" are displayed on the display unit 12 as shown in FIG. 10(d)

Thereafter, to the character string of "KEUKA", when the normal input operation by a short press is detected continuously, the control unit 16 changes the character string to "KOUKA" as shown in FIG. 10(e). A kana-kanji conversion is performed once again to the character string of "KOUKA" that has been inputted correctly, and thereby the string is converted correctly to kanji "KOUKA" as shown in FIG. 9(f).

As described above, the history of the input of the kana characters on the basis of segment through the normal input operation before confirmation of the inputted characters is stored in the storage unit 14 and is used for the correcting operation, thereby, even after the inputted characters are confirmed, the inputted character string can be corrected quickly through a simple and efficient operation that requires fewer steps.

It should be noted that the present invention is not limited to the above described embodiments, and many modifications and changes are available. For example, in the above described each embodiment, for convenience of explanation, the correction character candidates are highlighted in response to the correcting operation by a long press for the first time, and the cursor is moved to each of the highlighted correction character candidates in response to the correcting operation by a long press which is made for the second time or later. However, it is possible to configure so that the correction character candidates are highlighted and the cursor is moved to one of the highlighted correction character candidates in response to the correcting operation by a long press for the first time. Thus the number of presses of the key required for the correcting operation can be further reduced. In this case, for the flowchart in FIG. 4, the process moves from step S14 to step S15, and for FIG. 7, the process moves from step S34 to S35.

In addition, in the above described each embodiment, a "short press" is described as a "normal input operation" and a "long press" is described as a "correcting operation" with respect to key input. However, they can be reversed, that is, the "long press" can be the "normal input operation" and the "short press" can be the "correcting operation". It is preferable to allow a user to set either one of the above described settings to suit his/her preference.

Specifically, when the "short press" is set as the "correcting operation", it should be distinguished from the "long press" for the "normal input operation". In this case, since a press is determined as the "normal input operation" by a "long press" only when the duration of the press exceeds the threshold Tth after starting the press as shown in FIG. 3, it is preferable that the input result is not displayed on the display unit 12 unless the duration of the press exceeds the threshold Tth even if the key is being pressed by the user, and displayed at the time when the duration of the press exceeds the threshold Tth. Thus the timing at which the operation is shifted from the "correcting operation" to the "normal input operation" is clearly indicated to the user.

Figure 11:
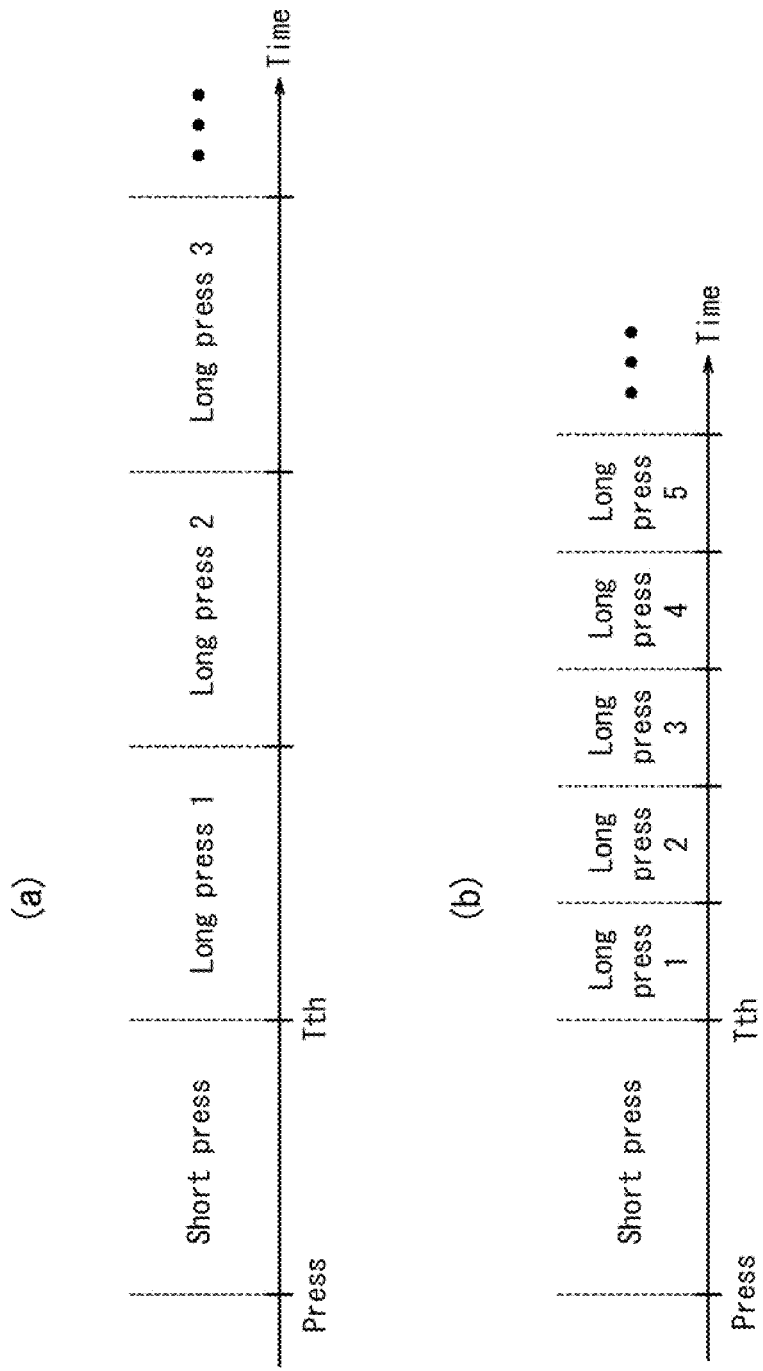
FIG. 11 is a conceptual diagram illustrating an alternative example of a "long press" operation in accordance with each embodiment.

In this manner, when the "long press" is set as the "normal input operation", when the same key is pressed successively to sequentially change kana characters of a certain row (such as from "NA" to "NI" to "NU"), the user needs to press the key (long press) until the duration of the press exceeds the threshold Tth and thereafter release it and again press the key long and release it each time. Thus the user needs to repeat such operation, which may be troublesome and time-consuming as well. Consequently, as shown in FIG. 11(a), for example, in the case where a press is determined as a long press since a key is kept pressed for a period of time exceeding the time threshold Tth and thereafter the key is still kept pressed for a period of time exceeding another time threshold, the operation may be processed as a plurality of long presses of a key, such as "long press 1", "long press 2" and "long press 3". In this case, the need to release the press of the key each time the key is pressed can be eliminated. Further, as shown in FIG. 11(b), when intervals between the time thresholds for successive long presses are set short, once a press is determined as a long press, a user can change kana characters sequentially in a short period of time by keeping the key pressed.

When combining such processing with the above described each embodiment, the operation by the user will become easier and efficient. For example, in the case where the "long press" is set as the "correcting operation", the user does not need to repeat the "long press" many times (release after press) when making a correction, but may keep the key pressed long to move the cursor sequentially to the desired character to be corrected and release the key at the point of time when the cursor reaches the character the user wants to correct.

Further, the input unit 11 of the cell phone 10 in accordance with the above each embodiment is described as a keyboard provided with mechanical keys or buttons. However, the present invention can be implemented, for example, by employing an input unit which is configured to display a key shape on a touch panel and to accept input by a press to the touch panel corresponding to a part of the key that is displayed. The above described processing, in which when a key is kept pressed long, it is considered as a plurality of successive long presses, is advantageous especially to the case where an input is made by use of an input unit provided with such a touch panel.

In addition, it should be noted for the above described "normal input operation" and "correcting operation", if only the input mode to the input unit 11 can be determined by the input mode determination unit 13, the mode is not necessarily limited to a "long press" and a "short press", but various kinds of input modes can be conceived. For example, based on the time threshold Tth as described in FIG. 11, a short press within the time threshold Tth may be processed as the "normal input operation", and when the key is kept pressed long over the time threshold Tth, the operation may be processed to sequentially change a plurality of kana characters assigned to the key that is pressed long (that is, the long press for this case is also processed as the normal input operation). As for the "correcting operation" for this case, it is possible to configure so that a press like a double click in which "quick two-time short presses" is performed to the same key may be a trigger to get into the "correcting operation" mode, and after the "quick two-time short presses", the "correcting operation" can be performed by a "short press" of the same key.

Industrial Applicability

According to the present invention, input to the input unit is performed in the second input mode, and thereby, among inputted character strings, characters corresponding to characters assigned to a key used for the input in the second input mode is searched as correction character candidates, and to the searched correction character candidates, the cursor is moved sequentially in response to the input in the second input mode. Thus correction of the inputted character can be performed quickly with a simple and less-burdened operation.

The invention claimed is:

1. An input apparatus comprising:
an input unit for accepting an input;
a display unit for displaying an input result to the input unit;
an input mode determination unit for determining whether the input to the input unit is a first input mode or a second input mode; and
an input control unit for controlling, when the input to a key of the input unit is determined as the first input mode by the input mode determination unit, so that a plurality of characters assigned to the key are sequentially changed and displayed on the display unit as input character candidates in response to the input, and when the input to the key of the input unit is determined as the second input mode by the input mode determination unit, for searching a previously inputted character string to find characters corresponding to the characters assigned to the key among the previously inputted character string, wherein the characters found by the searching are displayed on the display unit as correction character candidates, and controlling movement of a cursor displayed on the display unit to the correction character candidates searched for in response to the input.

2. The input apparatus according to claim 1, wherein the input control unit controls the display unit to emphasis-display on the searched correction character candidates to be recognized in response to an input in the second input mode, and controls the cursor to move sequentially to the correction character candidates emphasis-displayed in response to a plurality of inputs in the second input mode.

3. The input apparatus according to claim 1, wherein the input mode determination unit determines an input whose duration of a press to a key of the input unit is within a predetermined time threshold as the first input mode, and determines an input whose duration of a press to a key of the input unit exceeds the predetermined time threshold as the second input mode.

4. The input apparatus according to claim 1, wherein the input mode determination unit determines an input whose duration of a press to a key of the input unit exceeds a predetermined time threshold as the first input mode, and determines an input whose duration of a press to a key of the input unit is within the predetermined time threshold as the second input mode.

5. The input apparatus according to claim 1, wherein when the inputted character string is a kana character string before confirmation and the input to the key of the input unit is determined as the second input mode by the input mode determination unit, the input control unit searches, among the inputted character string displayed on the display unit, kana characters corresponding to the kana characters assigned to the key as the correction character candidates.

6. The input apparatus according to claim 1, wherein when the inputted character string includes a kanji or a kana character after confirmation and the input to the key of the input unit is determined as the second input mode by the input mode determination unit, the input control unit searches, among the inputted character string displayed on the display unit, kana characters corresponding to the kana characters assigned to the key as the correction character candidates.

7. The input apparatus according to claim 6, further comprising a storage unit for storing a correlation between each kanji and phonetic kana characters thereof,
wherein the input control unit further searches, among the inputted character string displayed on the display unit, a kanji having phonetic kana characters starting from a kana character assigned to the key as a correction character candidate from the storage unit, and based on the correlation between each kanji and phonetic kana characters thereof stored in the storage unit, controls so that a correction character candidate onto which the cursor moves based on the second input mode is converted into kana characters representing a reading thereof and displayed on the display unit in an editable manner.

8. The input apparatus according to claim 6, further comprising a storage unit for storing history of kana characters used to input the character string,
wherein the input control unit further searches, among the inputted character string displayed on the display unit, a kanji having phonetic kana characters starting from a kana character assigned to the key as a correction character candidate from the storage unit, and based on the history of kana characters used to input the character string stored in the storage unit, controls so that a correction character candidate onto which the cursor is moved based on the second input mode is returned to kana characters before confirmation and is displayed on the display unit in an editable manner.

9. The input apparatus according to claim 6, further comprising a storage unit for storing history of kana characters used to input the character strings and history of segments used to confirm the inputted character strings respectively,
wherein the input control unit further searches, among the inputted character strings displayed on the display unit, a kanji having phonetic kana characters starting from a kana character assigned to the key as a correction character candidate from the storage unit, and based on the history of the kana characters used to input the character strings and the history of segments used to confirm the inputted character strings respectively, controls so that a correction character candidate onto which the cursor is moved based on the second input mode is returned to kana characters before confirmation on the segment basis and is displayed on the display unit in an editable manner.

10. The input apparatus according to claim 2, wherein the input mode determination unit determines an input whose duration of a press to a key of the input unit is within a predetermined time threshold as the first input mode, and determines an input whose duration of a press to a key of the input unit exceeds the predetermined time threshold as the second input mode.

11. The input apparatus according to claim 2, wherein the input mode determination unit determines an input whose duration of a press to a key of the input unit exceeds a predetermined time threshold as the first input mode, and determines an input whose duration of a press to a key of the input unit is within the predetermined time threshold as the second input mode.

12. The input apparatus according to claim 2, wherein when the inputted character string is a kana character string before confirmation and the input to the key of the input unit is determined as the second input mode by the input mode determination unit, the input control unit searches, among the inputted character string displayed on the display unit, kana characters corresponding to the kana characters assigned to the key as the correction character candidates.

13. The input apparatus according to claim 3, wherein when the inputted character string is a kana character string before confirmation and the input to the key of the input unit is determined as the second input mode by the input mode determination unit, the input control unit searches, among the inputted character string displayed on the display unit, kana characters corresponding to the kana characters assigned to the key as the correction character candidates.

14. The input apparatus according to claim 4, wherein when the inputted character string is a kana character string before confirmation and the input to the key of the input unit is determined as the second input mode by the input mode determination unit, the input control unit searches, among the inputted character string displayed on the display unit, kana characters corresponding to the kana characters assigned to the key as the correction character candidates.

15. The input apparatus according to claim 2, wherein when the inputted character string includes a kanji or a kana character after confirmation and the input, to the key of the input unit is determined as the second input mode by the input mode determination unit, the input control unit searches, among the inputted character string displayed on the display unit, kana characters corresponding to the kana characters assigned to the key as the correction character candidates.

16. The input apparatus according to claim 3, wherein when the inputted character string includes a kanji or a kana character after confirmation and the input to the key of the input unit is determined as the second input mode by the input mode determination unit, the input control unit searches, among the inputted character string displayed on the display unit, kana characters corresponding to the kana characters assigned to the key as the correction character candidates.

17. The input apparatus according to claim 4, wherein when the inputted character string includes a kanji or a kana character after confirmation and the input to the key of the input unit is determined as the second input mode by the input mode determination unit, the input control unit searches, among the inputted character string displayed on the display unit, kana characters corresponding to the kana characters assigned to the key as the correction character candidates.

* * * * *